(12) United States Patent
Ring

(10) Patent No.: US 6,684,151 B1
(45) Date of Patent: Jan. 27, 2004

(54) METHOD FOR MONITORING AN INTERNAL COMBUSTION ENGINE

(75) Inventor: Stefan Ring, Friedrichshafen (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 85 days.

(21) Appl. No.: 10/018,136

(22) PCT Filed: Jun. 15, 2000

(86) PCT No.: PCT/EP00/05489

§ 371 (c)(1),
(2), (4) Date: Apr. 15, 2002

(87) PCT Pub. No.: WO00/79113

PCT Pub. Date: Dec. 28, 2000

(30) Foreign Application Priority Data

Jun. 18, 1999 (DE) .......................................... 199 27 846

(51) Int. Cl.⁷ ............................................... G06F 19/00
(52) U.S. Cl. ......................... 701/110; 701/114; 123/435
(58) Field of Search ................................ 701/101, 107, 701/110, 112, 114; 123/406.22, 406.41, 434, 435, 676, 690, 691; 73/117.3

(56) References Cited

U.S. PATENT DOCUMENTS 4,944,271 A * 7/1990 Iwata et al. ............. 123/406.41
5,230,316 A * 7/1993 Ichihara et al. ......... 123/406.38
5,712,424 A * 1/1998 Reed ............................ 73/115
6,564,623 B2 * 5/2003 Zanetti ....................... 73/117.3
6,609,497 B2 * 8/2003 Daniels ................. 123/406.43

FOREIGN PATENT DOCUMENTS

| DE | 3912416 | 7/1990 |
|----|---------|--------|
| DE | 4127950 | 12/1992 |
| DE | 19544613 | 6/1997 |
| EP | 0399069 | 11/1990 |
| EP | 0569608 | 11/1993 |
| WO | 00/79113 | 12/2000 |

* cited by examiner

Primary Examiner—John Kwon
(74) Attorney, Agent, or Firm—Crowell & Moring LLP

(57) ABSTRACT

A method of monitoring an internal combustion engine by continuously computing pressure values of the cylinders from current parameters of the engines by using a mathematical model. At each point in time, there are both a computed pressure value and a measured pressure value, which are compared in order to provide information concerning the condition of a pressure sensor and to deactivate a faulty pressure sensor and use the computed pressure values for further operation of the engine.

7 Claims, 5 Drawing Sheets

METHOD FOR MONITORING AN INTERNAL COMBUSTION ENGINE

BACKGROUND AND SUMMARY OF THE INVENTION

This application claims the priority of German Patent 199 27 846.6, filed Jun. 18, 1999, the disclosure of which is expressly incorporated by reference herein.

The invention relates to a method of monitoring an internal-combustion engine in which pressure values of the cylinder space of the internal-combustion engine are measured by means of a pressure sensor and the condition of the sensor is determined therefrom.

The proper functioning of an internal-combustion engine is monitored during the operation by an electronic engine control unit. Thus, it is known, for example, from German Patent Document DE 41 27 950 A1 to monitor the sensor detecting the internal pressure of the cylinders. In this case, the pressure values are checked as to whether they are within a tolerance band with variable limit values. The limit values, in turn, are a function of the loading of the internal-combustion engine. Pressure values outside the tolerance band are interpreted as being faulty. As a subsequent reaction, the corresponding cylinder is changed to idling. It is problematic that a short-term disturbance of the sensor signal or the aging of the sensor will necessarily cause a cylinder switch-off; that is, the internal-combustion engine will no longer operate normally.

A diagnostic process for pressure sensors of an internal-combustion engine is known from European Patent Document EP 0 569 608 A1. In this process, the pressure values in the compression cycle or in the upper dead center are compared with a reference value. In the case of a persistently faulty pressure sensor, a visual or acoustic fault indication is activated as a consequent reaction.

Based on the above-described prior art, it is an object of the invention to ensure the normal operation of the internal-combustion engine as long as possible.

This object is achieved in that pressure values of the cylinder space are continuously computed from current parameters of the internal-combustion engine by means of a mathematical model. At any point in time, a measured pressure value and a computed pressure value are present isochronously. From the comparison of the computed pressure values and the measured pressure values, information is then obtained concerning the condition of the pressure sensor. With the detection of a permanently faulty pressure sensor, the latter is deactivated. The further operation of the internal-combustion engine takes place on the basis of the computed pressure values; that is, the computed pressure values are set as the relevant pressure values.

A permanently faulty pressure sensor is detected if, in a first step, a deviation is present outside a tolerance band consisting of a first and second limit value, and in a second step, the amount of the deviation is greater than a third limit value. The deviation is determined from the measured and computed pressure values.

If it is detected in the second step that the amount of the deviation is smaller than the third limit value, the measured pressure values are corrected.

The method according to the invention therefore permits a normal operation of the internal-combustion engine even if, for example, a short-circuit of the sensor is present. It is another advantage that a faulty pressure sensor signal can be corrected by the reference values, for example, in the case of a zero-point fault or amplification fault of the pressure sensor.

The mathematical model for computing the pressure values of the cylinder space is represented by a differences equation. The description of the thermodynamic relationships by way of a differences equation has the advantage that the method is real-time-capable. This means that with respect to a measured pressure value, a correspondingly computed pressure value is present at any point in time during the operation of the internal-combustion engine.

Other objects, advantages and novel features of the present invention will become apparent from the following detailed description of the invention when considered in conjunction with the accompanying drawings.

BRIEF DESCRIPTION OF THE DRAWINGS

The figures illustrate a preferred embodiment of the invention.

DETAILED DESCRIPTION OF THE DRAWINGS

Figure 1:
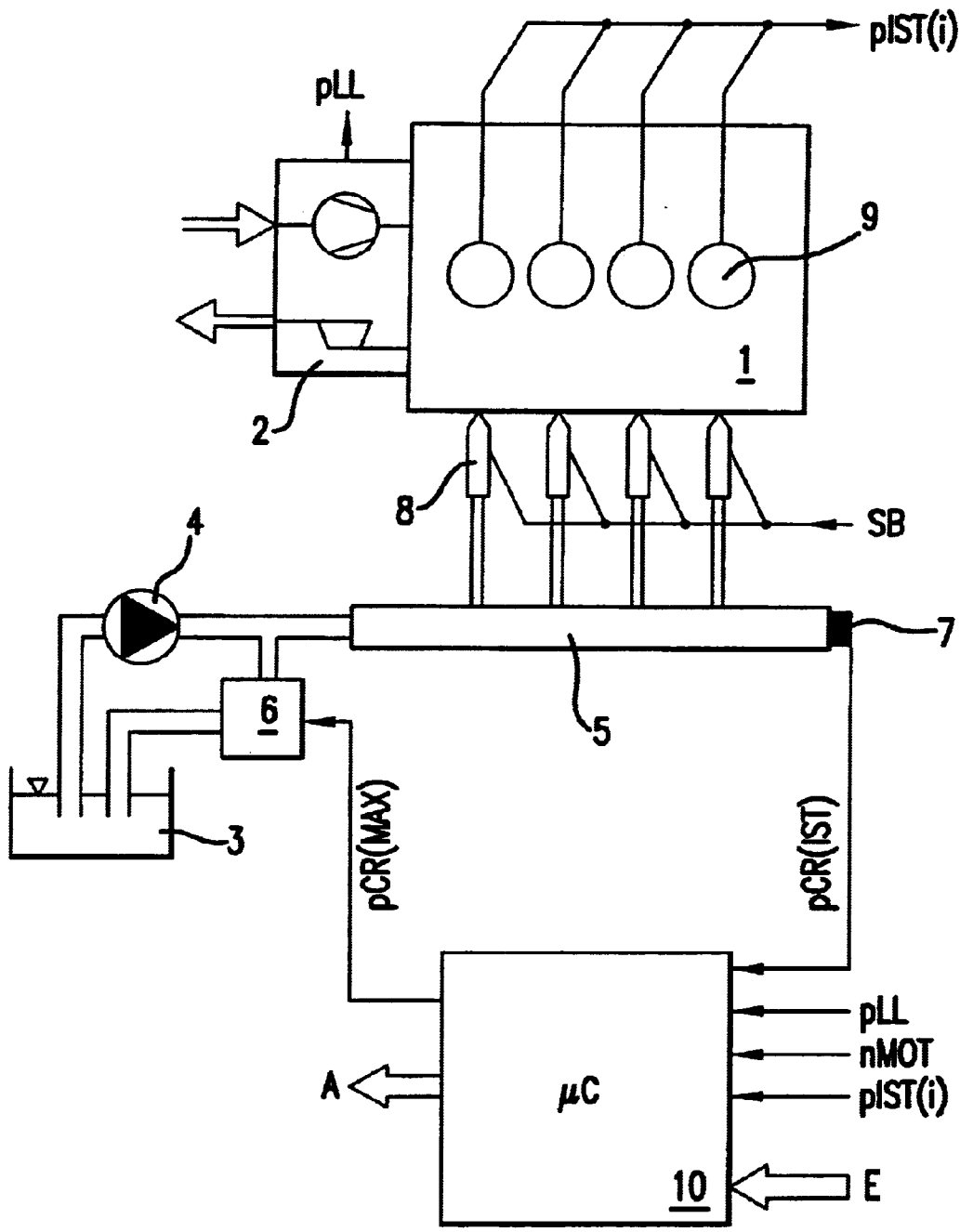
FIG. 1 is a block diagram of an accumulator injection system of an engine.

FIG. 1 is a block diagram of an internal-combustion engine with a mechanically controlled accumulator injection system (common rail). It shows an internal-combustion engine 1 with a turbocharger and a charge air cooler 2, an electronic engine control unit 10, a pump 4, a high-pressure accumulator (rail) 5, injectors 8 connected thereto and a pressure control valve 6. As known, the pump 4 delivers the fuel from a fuel tank 3 at a high pressure into the high-pressure accumulator 5. The pressure level of the high-pressure accumulator 5 is detected by way of a rail pressure sensor 7. Pipes with injectors 8 connected thereto for each cylinder of the internal-combustion engine 1 branch off the high-pressure accumulator 5.

The electronic engine control unit 10 automatically controls the condition of the internal-combustion engine 1. The following is shown as input quantities of the electronic control unit 1): Pressure of the cylinder space pIST(i) which is measured by means of pressure sensors 9; pressure (pCR(IST)) of the high-pressure accumulator 5; pressure level (pLL) of the turbocharger with the charge air cooler 2; and rotational speed (NMOT) of the internal-combustion engine 1. The additional input quantities relevant for the operation of the internal-combustion engine 1 are indicated by reference symbol E. Output quantities (A) of the electronic engine control unit 10 are, for example, triggering signals (SB) for the injectors 8 and the triggering signal (pCR(MAX)) for the pressure control valve 6. The pressure level in the high-pressure accumulator 5 is adjusted by way of the pressure control valve 6.

As illustrated in FIG. 1 by the two arrows, air is fed and exhaust gases are discharged respectively to or from the turbocharger with the charge air cooler 2.

Figure 2:
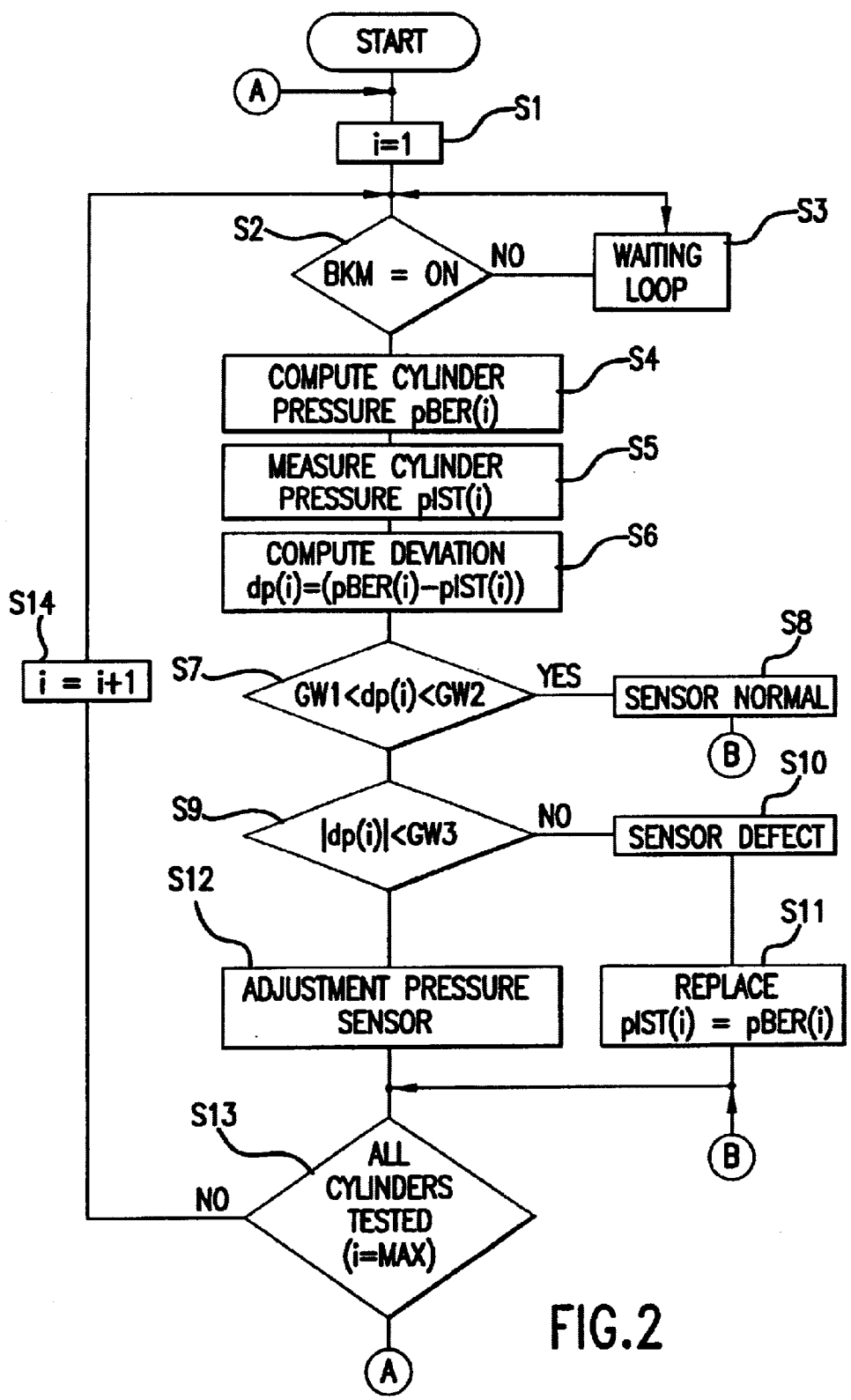
FIG. 2 is a first program flow chart.

FIG. 2 shows a program flow chart for computing pressure values of the cylinder space for all cylinders. The computing process is started after the conclusion of the initializing of the electronic engine control unit 10. In step S1, a variable i is equal to 1. This variable corresponds to the cylinder numbering. In step S2, it is checked whether the internal-combustion engine 1 has started. If the test result is negative, that is, the internal-combustion engine 1 has not yet been started, there is a passing through a waiting loop in step S3. If the internal-combustion engine 1 has been started, the cylinder pressure pBER(i) is computed in step S4. In the first program pass, this is therefore the pressure level of the first cylinder. The computing process by means of the mathematical model is explained in connection with FIG. 4. Then, in step S5, the measured cylinder pressure pIST(i) is read in. In step S6, a deviation dp(i) is determined from the computed and the measured cylinder pressure. In step S7, it will then be checked whether this deviation dp(i) is within a tolerance band consisting of a first limit value GW1 and a second limit value GW2. If the deviation is within the tolerance band, it is determined in step S8 that the pressure sensor is in the normal condition. Then, the program flow chart branches to point B.

If the test result in step S7 is negative, it is additionally checked in step S9 whether the amount of the deviation dp(i) is smaller than a third limit value GW3. If this is so, the pressure sensor 9 is adjusted in step S12. This always occurs when an amplification or zero-point fault of the pressure sensor 9 is present. In step S12, the measured signal pIST(i) is therefore adapted to the reference value, thus to the computed cylinder pressure pBER(i). If it is determined in step S9 that the amount of the deviation dp(i) is larger than the third limit value GW3, it will be determined in step S10 that the sensor has been permanently damaged. A permanent damage of the pressure sensor 9 exists, for example, in the event of a line interruption or a short circuit. Then, the pressure sensor is deactivated in step S11 and the computed pressure values pBER(i) are set as valid pressure values. For the further control and automatic control of the internal-combustion engine 1, these computed pressure values pBER(i) will therefore be used; that is, they represent a replacement function. In step S13, it is queried whether all cylinders have been tested. If this is so, the program flow chart branches to point A and starts again with step S1. If the test result in step S13 is negative, that is, not all cylinders have yet been queried, by means of step S14, the pass variable i is increased by 1. Then the program flow chart is continued by means of step S2.

Figure 3:
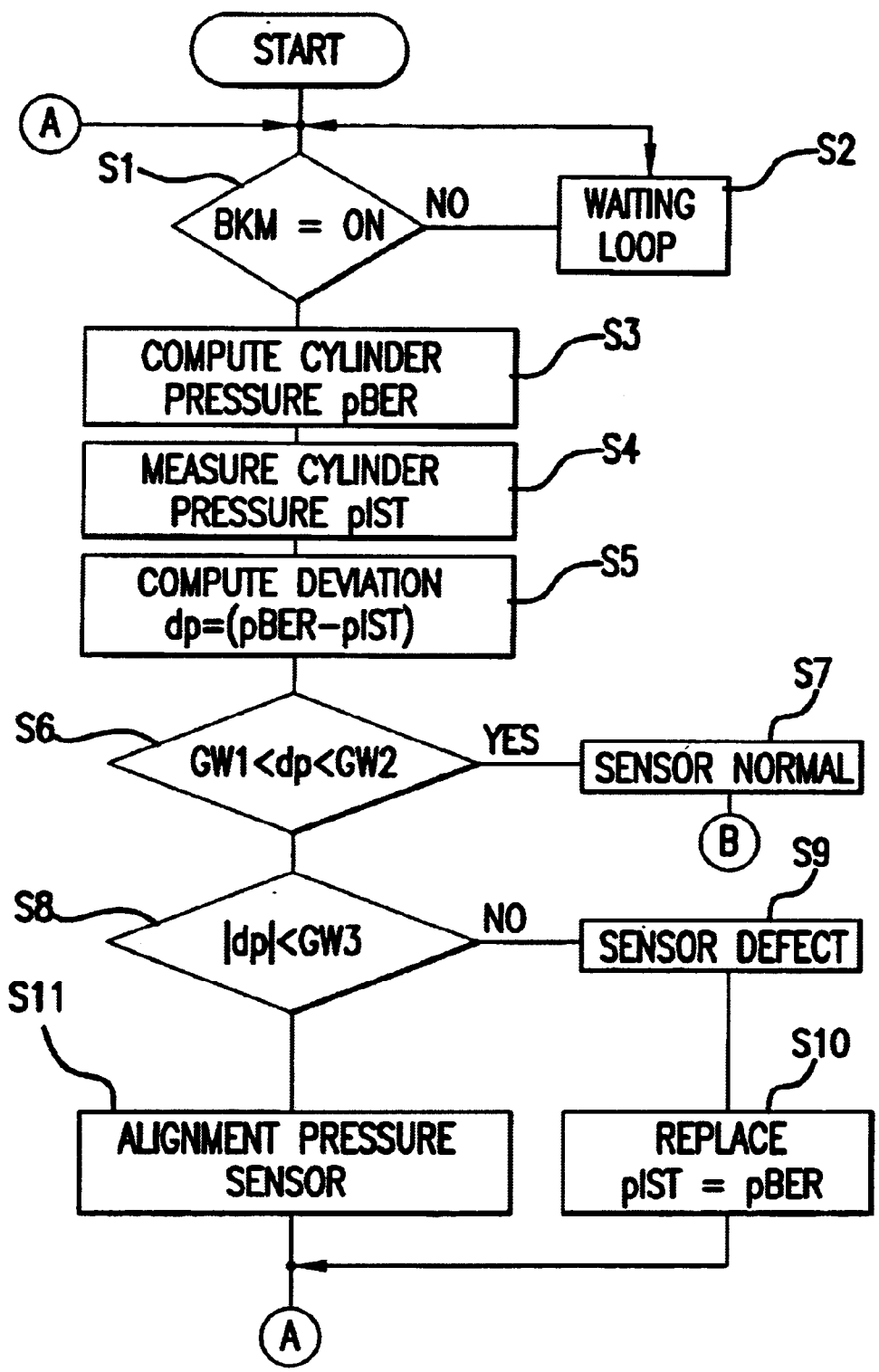
FIG. 3 is a second program flow chart.

FIG. 3 shows a program flow chart for computing the pressure values of the cylinder interior when only one pressure sensor is used. This program flow chart will therefore be used when not all combustion spaces of the internal-combustion engine 1 are equipped with a pressure sensor 9. The program flow chart corresponds to a reduced implementation of FIG. 2, steps S1 to S11 corresponding to steps S2 to S12 of FIG. 2. In this case, the computing process is implemented analogously, so that the above will apply.

Figure 4:
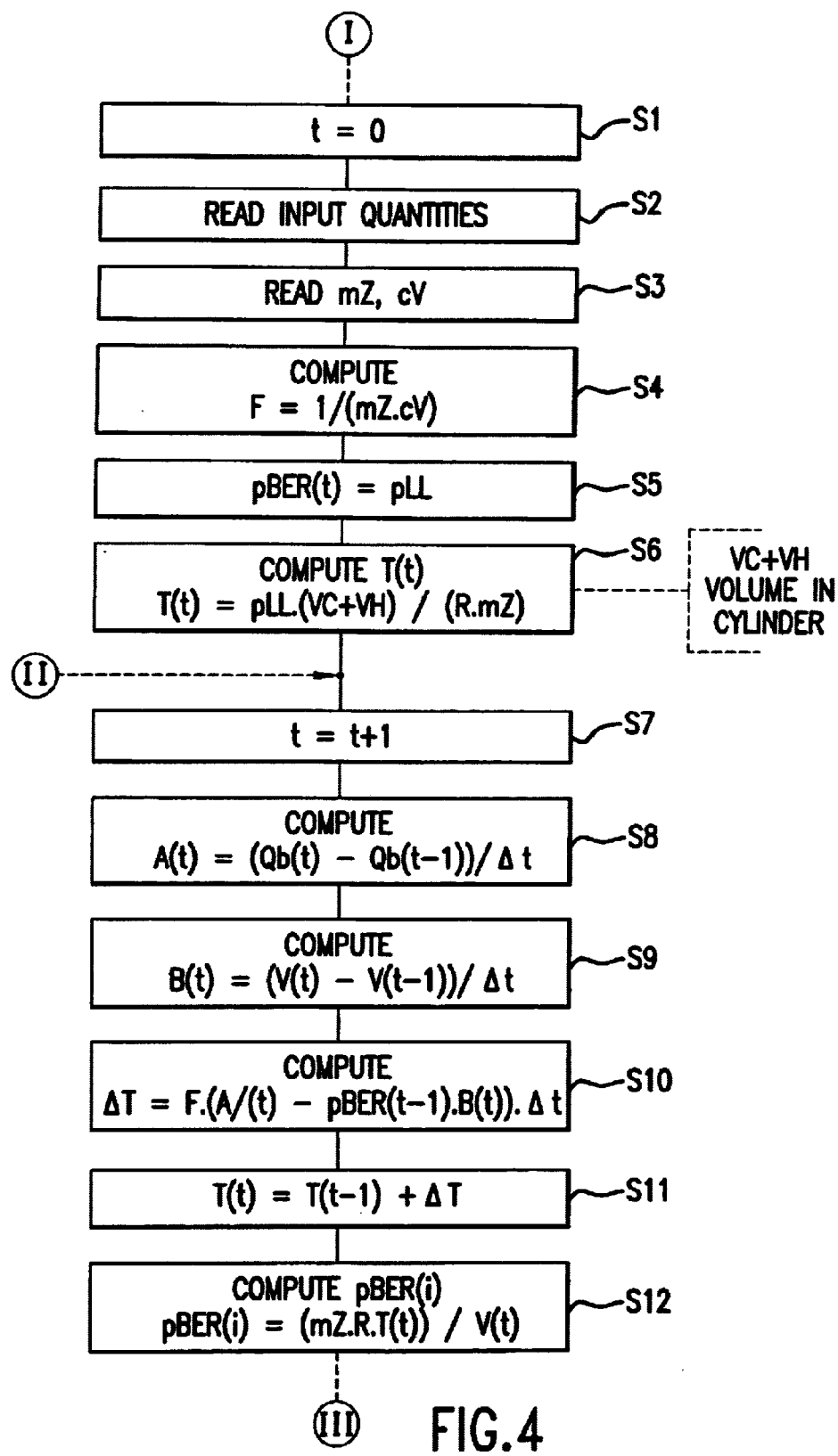
FIG. 4 is a program flow chart of the computation of the differences equation.

FIG. 4 is a program flow chart for computing the internal cylinder pressure pBER(i) by means of the mathematical model. The program flow chart starts at point I when there is a first pass through the computation of the pressure; that is, after the starting operation of the internal-combustion engine 1. In step S1, a query point in time t is set to be equal to 0. In step S2, the input quantities of the internal-combustion engine 1 will then be read in. Input quantities required for the computation are the pressure level pLL of the turbocharger with the charge air cooler 2, the fuel mass corresponding to the fuel volume to be injected, the fuel temperature and the rotational speed nMOT or the crankshaft angle. In step S3, the heat capacity with isochoric heating cV and the mass in the cylinder mZ are read in. The mass in the cylinder mZ can be determined in a tabulated manner or can be determined by means of a different method. Then, in step S4, a factor F is computed from the two values cV and mZ. In step S5, the pressure level of the charge air cooler pLL is assigned to the computed pressure of the cylinder space pBER(t). This value is used as an initial value for the lower dead center of the charge cycle. Thus, by way of the mass mZ in the cylinder and the volume, the temperature of the gas is also known in step S6:

$$T(t) = pLL \cdot (VC + VH) / (R \cdot mZ)$$

wherein

| pLL | charge air pressure |
|---|---|
| VC | dead volume |
| VH | volume cylinder |
| R | gas constant |
| mZ | mass in the cylinder |

In step S7, the query point in time t is increased by 1. In step S8, a quantity A(t) is computed corresponding to the heat increase during the query period $\Delta t$. Then, a quantity B(t) is computed in step S9 corresponding to the volume change during the query period $\Delta t$. In step S10, the temperature increase in the cylinder interior during the query period is determined from the factor F, the quantities A(t) and B(t) as well as the interior pressure pBer(t−1) previously computed (in? translator) a query cycle. The following applies:

$$\Delta T = F \cdot ((A(t) - pBER(t-1) \cdot B(t)) \cdot \Delta t$$

wherein

| $\Delta T$ | temperature increase |
|---|---|
| $\Delta t$ | query period (t, t − 1) |
| F | factor f = (cV, mZ) |
| A | heat change in the cylinder ($\Delta Ob/\Delta t$) |
| pBER | pressure in the cylinder (computed) |
| B | volume change in the cylinder ($\Delta V/\Delta t$)) | wherein

| cV | heat capacity with isochoric heating |
|---|---|
| mZ | mass in the cylinder |
| Ob | heat of the burnt fuel |
| V | volume in the cylinder (VC, VC) |
| t | current query point in time |
| t − 1 | previous query point in time |

The differences equation represents the thermodynamic relationships in the cylinder interior. Here, the thermodynamic relationships to be computed at high mathematical expenditures are illustrated by way of this simple differences equation. As a result, the advantage is achieved that the process is real-time-capable. This means that a correspondingly computed value pBER(i) is present in an isochronous manner for each measured pressure value of the cylinder interior pIST(i). The process illustrated in steps S8 and S10 uses two points in time (t, t−1). Naturally, it is also possible to implement the process by way of several time values.

In step S11, the temperature increase is added to the temperature value of the preceding query point in time T(t−1). This results in the new temperature value T(t). In step S12, the computed pressure value pBER(i) is then formed from the temperature T(t) by way of the general gas equation. Then the program flow chart branches to point III, corresponding to step S5 from FIG. 2 and step S4 from FIG. 3 respectively. For the next pressure value pBER(i) to be computed, the program flow chart starts at point II.

Figure 5:
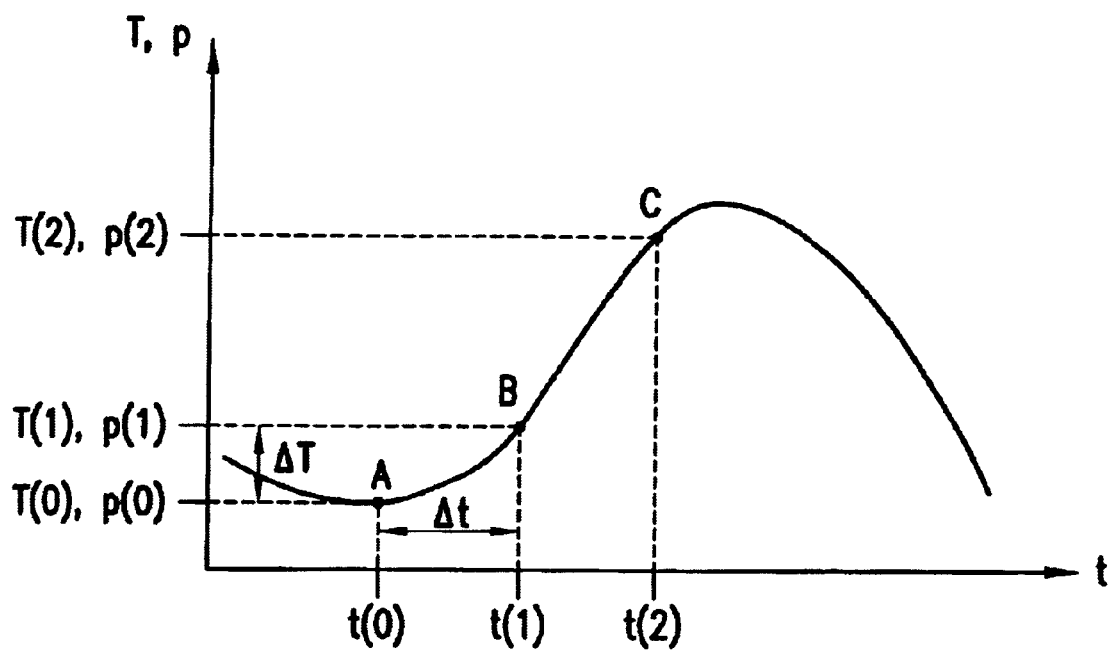
FIG. 5 is a graph of pressure and temperature of a cylinder.

FIG. 5 is a simplified representation of the course of the temperature T or of the course of the pressure p in the cylinder space of the internal-combustion engine 1 over the time t. These are indicated as a sinusoidal curve. The operating point A on the curve is the result of the value p(0) measured at the point in time t(0). After the starting operation, this is the pressure level pLL of the charge air cooler 2. This value is therefore the starting value for the computation process. The value T(0) results from the value p(0) and the gas equation corresponding to step S6 of FIG. 4. At the point in time t(1), the temperature increase ΔT is computed according to the computation process of FIG. 4. This results in point B on the curve with the ordinate values T(1) or p(1). At the point in time t(2), the new temperature increase is computed. This results in the point C on the curve. The further computation of the temperature and pressure values respectively takes place in the same manner.

The use of a differences equation instead of a exponent equation for the thermodynamic operations has the advantage that the model is real-time capable. In that a computed value pBER(i) is available at any point in time for the measured internal cylinder pressure pIST(i), the pressure sensor 9 can be monitored and can be adjusted in the event of a drift. Likewise, a permanently damaged pressure sensor is clearly recognized. In this event, the further operation of the internal-combustion engine is ensured on the basis of the computed pressure values pBER(i).

What is claimed is:

1. A method of monitoring an internal combustion engine comprising the steps of:

measuring pressure values of cylinders of the internal combustion engine by means of a pressure sensor;

monitoring the condition of the pressure sensor by means of the measured pressure values;

continuously computing, by means of a mathematical model, computed pressure values of the cylinder as a function of current parameters of the internal combustion engine whereby, at any point in time, a measured pressure value and a computed pressure value are isochronously present, resulting from a comparison of the measured pressure value and the computed pressure value;

checking the pressure sensor;

deactivating the pressure sensor when a permanently faulty pressure sensor is detected; and setting the computed pressure values as relevant pressure values and wherein continued operation of the internal combustion engine occurs on the basis of the computed pressure values.

2. The method according to claim 1, wherein the step of detecting a permanently faulty pressure sensor includes detecting of a deviation of measured values outside a tolerance band, wherein said tolerance band has a first limit value and a second limit value, and wherein the amount of deviation is greater than a third limit value and wherein the deviation is determined from the measured pressure values and the computed pressure values.

3. The method according to claim 2, wherein, when the deviation is within the tolerance band, a normal condition of the pressure sensor is determined.

4. The method according to claim 2, further comprising the step of correcting the measured pressure value when the amount of deviation is smaller than the third limit value.

5. The method according to claim 1, wherein the mathematical model is described by a difference equation in the form of $$\Delta T = F \cdot ((A(t) - pBER(t-1)) \cdot B(t)) \cdot \Delta t$$

wherein

| | |
|---|---|
| ΔT | temperature increase |
| Δt | period(t, t− 1) |
| F | factor f = (cV, mZ) |
| A | heat change in the cylinder (ΔOb/Δt) |
| pBER | pressure in the cylinder (computed) |
| B | volume change I the cylinder (ΔV/Δt) | wherein

| | |
|---|---|
| cV | heat capacity with isochoric heating |
| mZ | mass in the cylinder |
| Ob | heat of the burnt fuel |
| V | volume in the cylinder |
| t | current query point in time |
| t − 1 | previous query point in time. |

6. The method according to claim 5, further comprising the step of using the pressure level of air compressed by a turbo-charger with a charge air cooler as the starting quantity for the mathematical model.

7. A method of monitoring an internal combustion engine in which measured pressure values (pIST(i), I=1,2 . . . n) of the cylinder space of the internal combustion engine are measured by means of a pressure sensor and the condition of the pressure sensor is monitored by means of the measured pressure values (p(IST(i)), wherein, from current parameters of the internal combustion engine, computed pressure values (pBER(i), I−1,2 . . . n) of the cylinder space are continuously computed by means of a mathematical model, so that, at any point in time, a measured pressure value (pIST(i)) and a computed pressure value (pBER(i)) are isochoronously present, by means of a comparison of the measured pressure value (pIST(i)) and the computed pressure value (pBER(i)), the pressure sensor is checked, with the detection of a permanently faulty pressure sensor, the latter being deactivated, the computed pressure values (pBER(i)) being set as relevant pressure values, and the continued operation of the internal combustion engine taking place on the basis of the computed pressure values (pBER(i)).

* * * * *